(12) United States Patent
Tomishima

(10) Patent No.: US 11,268,904 B2
(45) Date of Patent: Mar. 8, 2022

(54) IMAGE FORMING APPARATUS FOR WEIGHT PROPERTY DETERMINATION

(71) Applicant: Hewlett-Packard Development Company, L.P., Spring, TX (US)

(72) Inventor: Yuichiro Tomishima, Yokohama (JP)

(73) Assignee: Hewlett-Packard Development Company, L.P., Spring, TX (US)

( * ) Notice: Subject to any disclaimer, the term of this patent is extended or adjusted under 35 U.S.C. 154(b) by 69 days.

(21) Appl. No.: 16/646,747

(22) PCT Filed: Oct. 11, 2018

(86) PCT No.: PCT/KR2018/011915
§ 371 (c)(1),
(2) Date: Mar. 12, 2020

(87) PCT Pub. No.: WO2019/088488
PCT Pub. Date: May 9, 2019

(65) Prior Publication Data
US 2020/0264103 A1 Aug. 20, 2020

(30) Foreign Application Priority Data
Oct. 31, 2017 (JP) .............................. JP2017-210700

(51) Int. Cl.
*G01N 21/57* (2006.01)
*G01B 11/06* (2006.01)
*G03G 15/00* (2006.01)

(52) U.S. Cl.
CPC ......... *G01N 21/57* (2013.01); *G01B 11/0625* (2013.01); *G03G 15/5029* (2013.01);
(Continued)

(58) Field of Classification Search
CPC .... B41J 11/009; G01B 11/0625; G01N 21/57; G03G 15/5029; G03G 15/6585; G03G 2215/00616; G03G 2215/00742
(Continued)

(56) References Cited

U.S. PATENT DOCUMENTS

| 5,138,178 A | 8/1992 | Wong et al. |
| 2005/0201808 A1 | 9/2005 | Barry et al. |

(Continued)

FOREIGN PATENT DOCUMENTS

| CN | 1652216 A | 8/2005 |
| CN | 1727201 A | 2/2006 |

(Continued)

*Primary Examiner* — Sunghee Y Gray
(74) *Attorney, Agent, or Firm* — Jefferson IP Law, LLP

(57) ABSTRACT

An image forming apparatus and method are disclosed. A detection light is radiated to a medium. An amount of transmitted light, an amount of regular reflected light, and an amount of diffuse reflected light are detected. A reflected-light-amount-equivalent value is obtained when the amount of regular reflected light is standardized based on the amount of diffuse reflected light. A glossy sheet-thickness coefficient is calculated by adding the reflected-light-amount-equivalent value to a transmitted-light-amount-equivalent value that is based on the amount of transmitted light. The weight property of the medium is determined, based on the glossy sheet-thickness coefficient, wherein the weight property comprises a basis weight or a thickness of the medium.

18 Claims, 9 Drawing Sheets

(52) U.S. Cl.
CPC ............. *G03G 2215/00616* (2013.01); *G03G 2215/00742* (2013.01)

(58) Field of Classification Search
USPC ........................................................ 356/445
See application file for complete search history.

(56) References Cited

U.S. PATENT DOCUMENTS

| | | | | |
|---|---|---|---|---|
| 2006/0140468 | A1* | 6/2006 | Holl | G07D 7/121 |
| | | | | 382/135 |
| 2007/0046713 | A1 | 3/2007 | Miyahara et al. | |
| 2008/0079943 | A1* | 4/2008 | Li | G01N 21/57 |
| | | | | 356/445 |
| 2009/0086217 | A1* | 4/2009 | Hayashihara | G03G 15/5029 |
| | | | | 356/630 |
| 2009/0136246 | A1* | 5/2009 | Murakami | G03G 15/5029 |
| | | | | 399/45 |
| 2012/0057145 | A1* | 3/2012 | Tunnell | G01J 3/42 |
| | | | | 356/51 |
| 2012/0306955 | A1 | 12/2012 | Pawlik et al. | |
| 2014/0210882 | A1* | 7/2014 | MacKenzie | B41J 25/308 |
| | | | | 347/8 |
| 2015/0261161 | A1 | 9/2015 | Waida et al. | |
| 2017/0214812 | A1 | 7/2017 | Tomishima | |
| 2019/0285540 | A1* | 9/2019 | Kawano | G01N 21/255 |

FOREIGN PATENT DOCUMENTS

| | | |
|---|---|---|
| CN | 101654013 A | 2/2010 |
| CN | 102478773 A | 5/2012 |
| CN | 105691008 A | 6/2016 |
| EP | 1 582 363 A1 | 10/2005 |
| EP | 3 511 776 A1 | 7/2019 |
| JP | 2014-193603 A | 10/2014 |
| JP | 2015-25756 A | 2/2015 |
| JP | 2015-125237 A | 7/2015 |
| JP | 2016-3132 A | 1/2016 |
| WO | WO 2014034209 A1 | 3/2014 |

* cited by examiner

[Fig. 1]
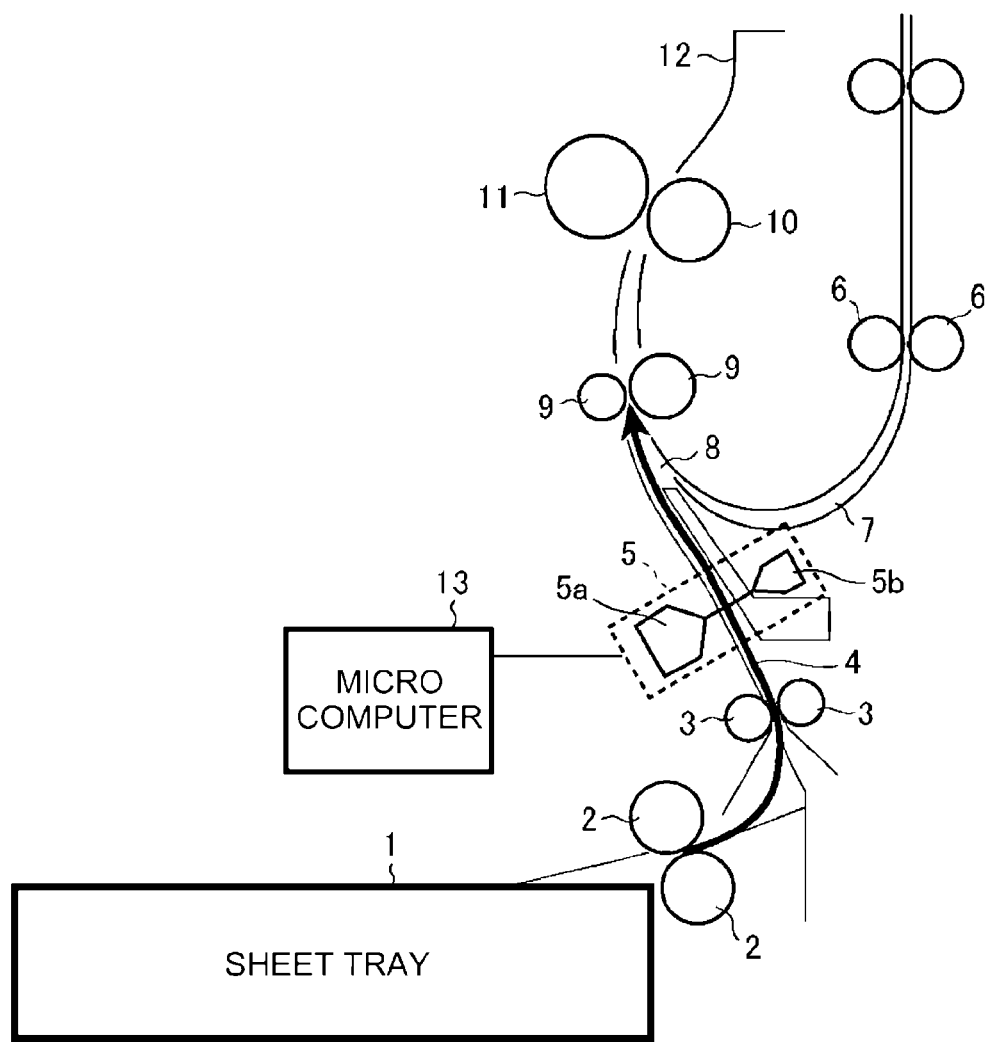

[Fig. 2]
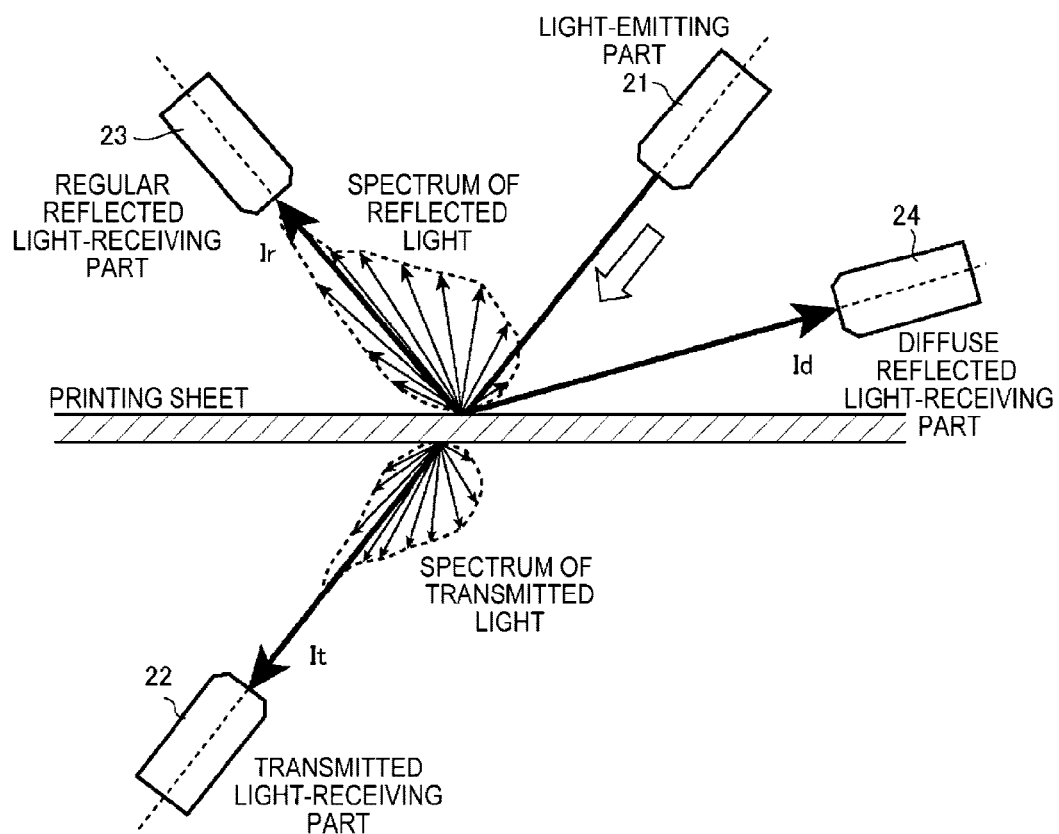

| Kgr | DISTANCE (mm) BETWEEN SENSOR UNITS ACCORDING TO TYPE OF IMAGE FORMING APPARATUS |
|---|---|
| 1 | ~1 |
| 2 | 1.1~1.5 |
| 3 | 1.6~2.0 |
| 4 | 2.1~2.5 |
| 5 | 2.6~3.0 |
| 6 | 3.1~3.5 |

(b)

| Kgm | DISTANCE (mm) BETWEEN SENSOR UNITS ACCORDING TO TYPE OF IMAGE FORMING APPARATUS |
|---|---|
| 1 | ~1.0 |
| 2 | 1.1~2.0 |
| 3 | 2.1~3.0 |
| 4 | 3.1~4.0 |

(c)

| Km | DISTANCE (mm) BETWEEN SENSOR UNITS ACCORDING TO TYPE OF IMAGE FORMING APPARATUS |
|---|---|
| 1 | 1~10 |
| 2 | 11~20 |
| 3 | 21~ |

[Fig. 4]

| Ka VALUE | COMPENSATED AMOUNT OF EMITTED LIGHT (%) |
|---|---|
| 1 | RESERVE(AT TIME OF CHANGE OF REFERENCE SHEET) |
| 2 | RESERVE(AT TIME OF CHANGE OF REFERENCE SHEET) |
| 3 | INITIAL VALUE (AT TIME OF SETTING IN PRODUCTION PROCESS) |
| 4 | CORRESPONDING TO ~ +5% |
| 5 | CORRESPONDING TO ~ +10% |
| 6 | CORRESPONDING TO ~ +20% |

[Fig. 5]
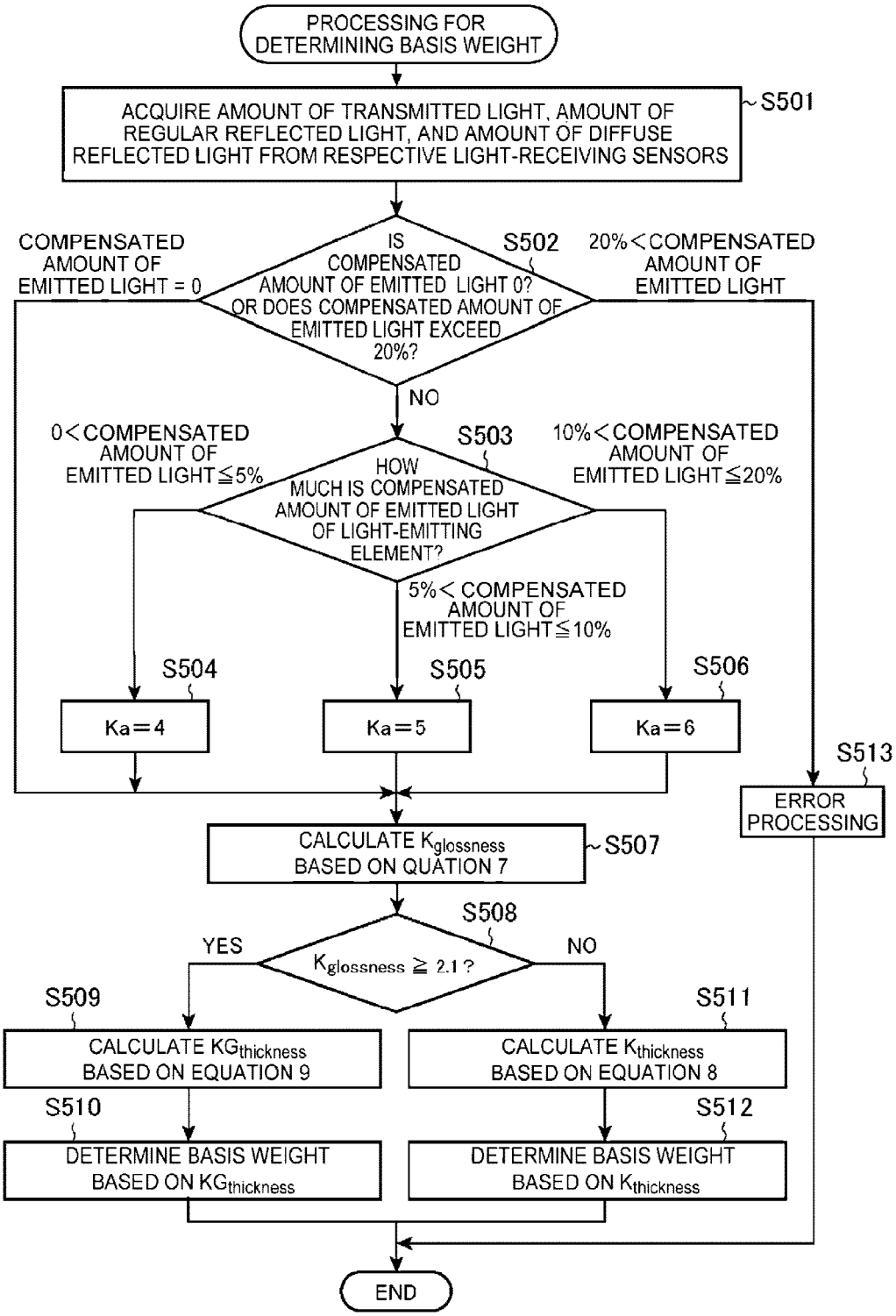

[Fig. 6]
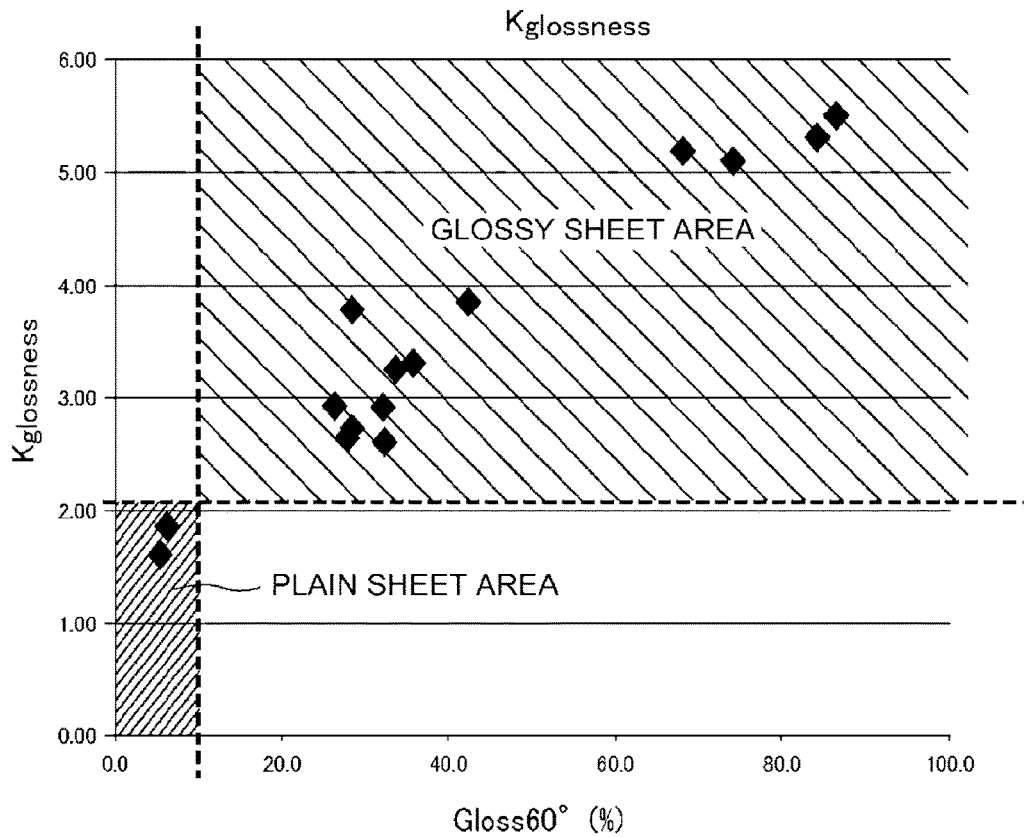
[Fig. 7]
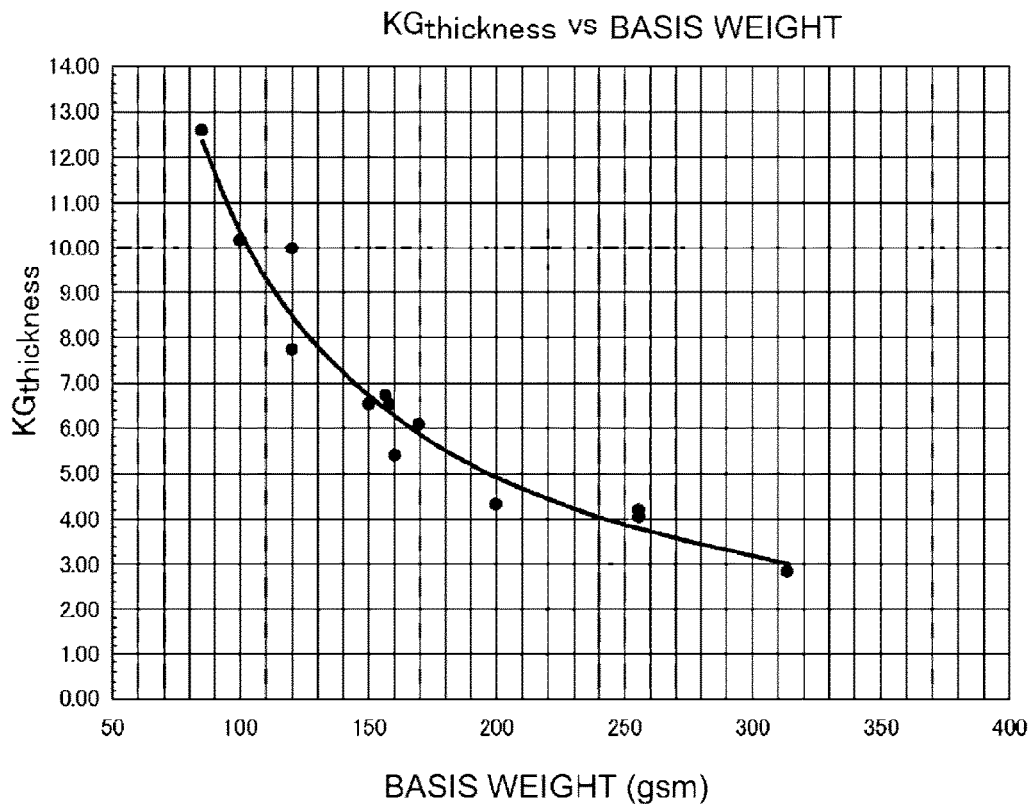

[Fig. 8]
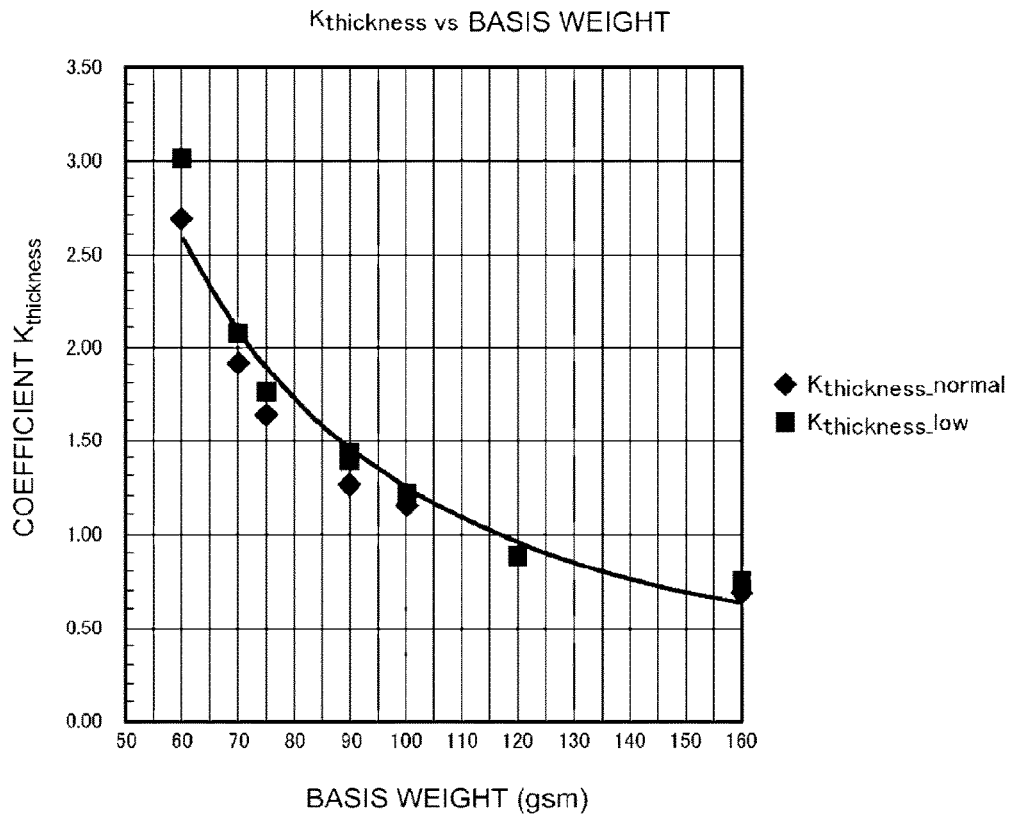
[Fig. 9]
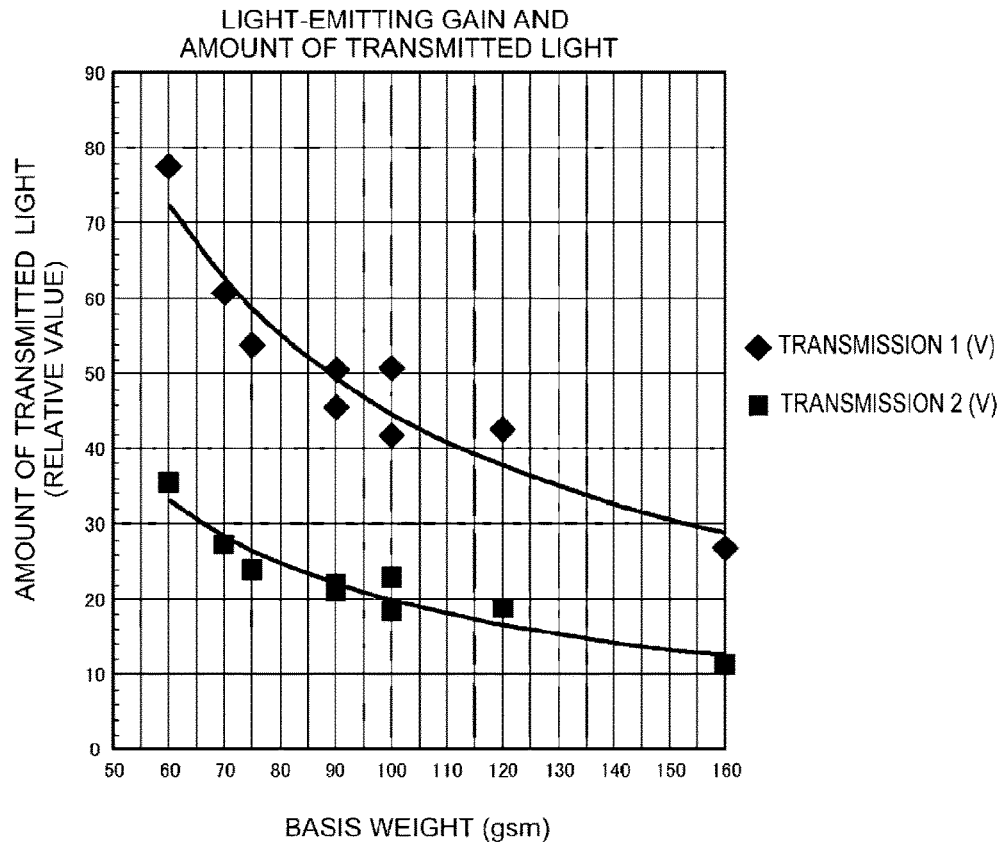

[Fig. 10]
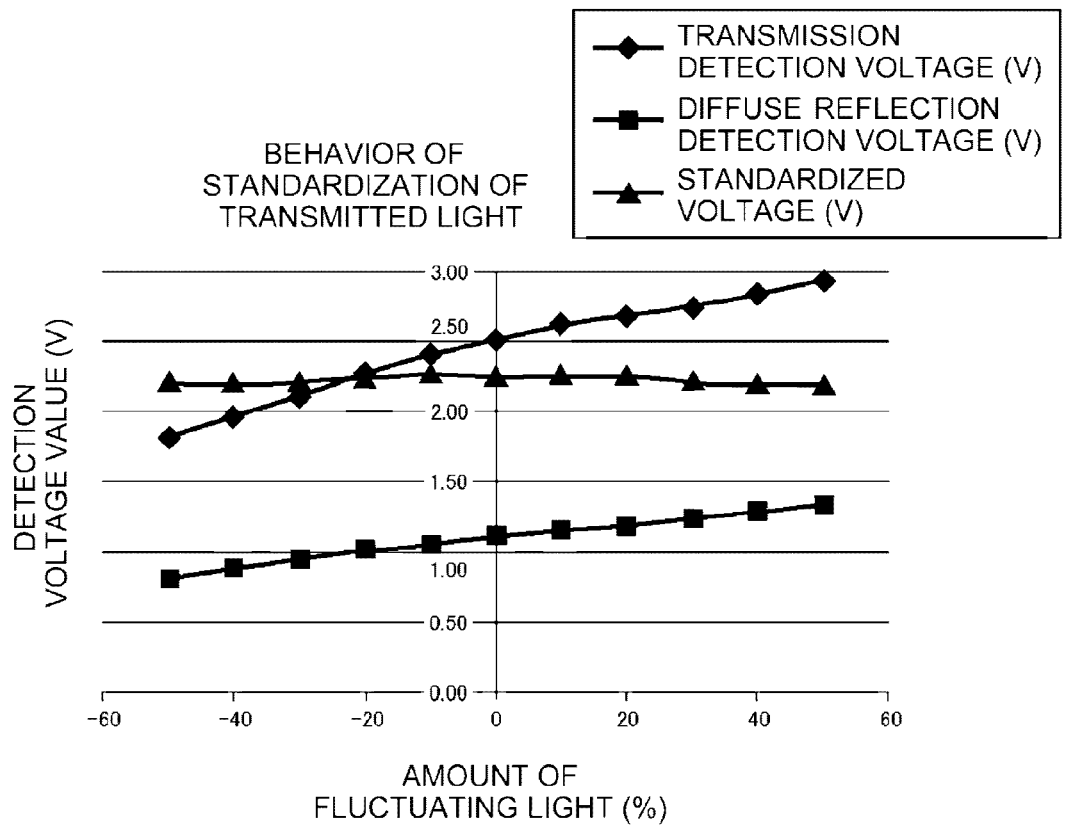
[Fig. 11]
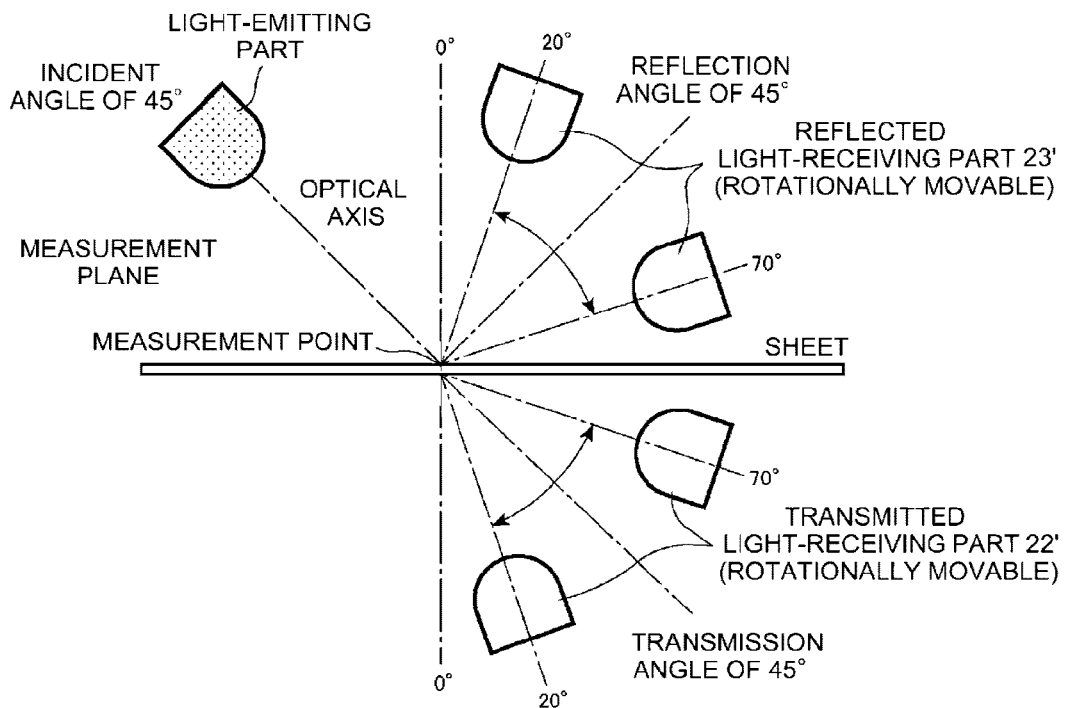

[Fig. 12]
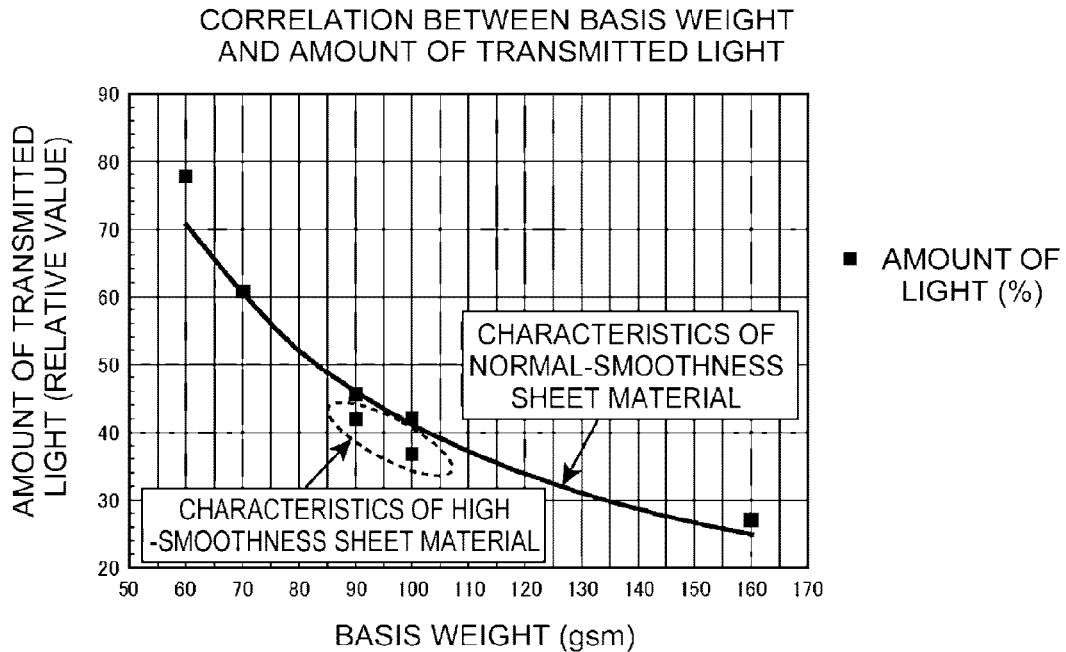
[Fig. 13]
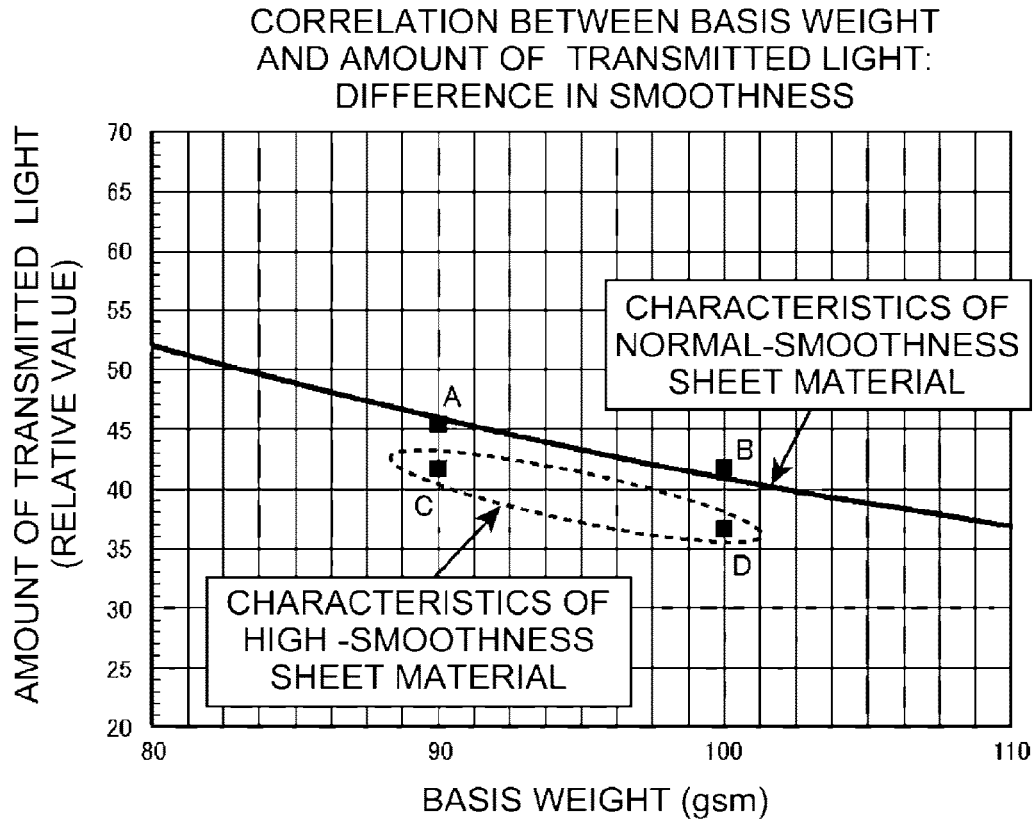

IMAGE FORMING APPARATUS FOR WEIGHT PROPERTY DETERMINATION

BACKGROUND ART

An image forming apparatus generally processes different types of printing sheets. Therefore, the image forming apparatus has printing conditions, such as conveying speeds, transfer conditions, and fixing conditions suitable for various kinds of printing sheets, and performs printing by adjusting the printing conditions according to the type of the printing sheet. To perform printing under suitable printing conditions, the type and the like of a printing sheet need to be determined or set in the image forming apparatus. In some techniques data output from an optical sensor may be used to determine the type of the printing sheet.

BRIEF DESCRIPTION OF DRAWINGS

FIG. 1 is a diagram illustrating a portion of an example image forming apparatus.

FIG. 2 is a diagram illustrating parts of a medium sensor of the example image forming apparatus.

FIG. 3 shows example tables relating to conveying path width-compensation coefficients.

FIG. 4 shows an example table relating to an initial calibration-compensation coefficient.

FIG. 5 is a flowchart illustrating an example processing of the example image forming apparatus.

FIG. 6 is a graph showing an example correlation between a glossy sheet-determination coefficient and glossiness.

FIG. 7 is a graph showing an example correlation between a glossy sheet-thickness coefficient and the thickness of a printing sheet.

FIG. 8 is a graph showing an example correlation between a plain sheet-thickness coefficient and the thickness of a printing sheet.

FIG. 9 is a graph showing example correlations between the basis weight of a printing sheet and the amount of light transmitted through the printing sheet, for different transmission levels of light emitted from a light-emitting source.

FIG. 10 is a graph showing example correlations between an amount of fluctuating light and an output value of the light-receiving sensor, for a transmission detection voltage, a diffuse reflection voltage and a standardized voltage.

FIG. 11 is a diagram illustrating parts of another example medium sensor.

FIG. 12 is a graph showing an example correlation between a basis weight of a printing sheet and the amount of light transmitted through the printing sheet.

FIG. 13 is a graph showing a part of the correlation shown in FIG. 12 (enlarged).

MODE FOR THE INVENTION

In the following description, with reference to the drawings, the same reference numbers are assigned to the same components or to similar components having the same function, and overlapping description is omitted.

In an image forming apparatus, when the type of a printing sheet is not accurately determined or set, the original image quality performance and the operation of the apparatus may be affected.

In regard to the determination of the type of a printing sheet, there are some factors which could lead to errors in determining the type of a printing sheet. However, one such factor (detection-inhibiting factors) in a method using an optical sensor, is affected by the smoothness or glossiness of the surface of a printing sheet, the degree of compression of a printing sheet, and the like. The detection of the basis weight or thickness of a printing sheet in the method using an optical sensor is performed based on the intensity of light transmitted through the printing sheet, that is, information about the amount of transmitted light, which is obtained from a light-receiving sensor, after light (generally, infrared light) is applied to a printing sheet. For example, the detection of the basis weight or thickness is performed based on the fact that the amount of transmitted light is changed according to the basis weight or thickness of the printing sheet. However, when a printing sheet of which the smoothness or glossiness of the surface is higher or a printing sheet having a higher degree of compression, the amount of reflected light is increased and the amount of transmitted light is reduced. Accordingly, the amount of transmitted light fluctuates due to a factor other than basis weight. Accordingly, this becomes a detection-inhibiting factor.

In this regard, a correlation between the amount of transmitted light and basis weight is shown in FIGS. 12 and 13, and each of FIGS. 12 and 13 is a graph of which a vertical axis represents the amount of transmitted light as a relative value and a horizontal axis represents basis weight (gsm). The amount of transmitted light as a relative value may refer to the amount of light, which is transmitted through the printing sheet, relative to a reference value that is determined.

As shown in FIGS. 12 and 13, a certain correlation is present between the amount of transmitted light and basis weight in the case of a normal-smoothness sheet material that is a so-called plain sheet. Accordingly, basis weight can be determined based on the correlation. On the other hand, in the cases of high-smoothness sheet materials C and D, such as glossy sheets, the amount of transmitted light is reduced as shown in FIG. 13 (an enlarged view of a part of FIG. 12). For this reason, a correlation between the amount of transmitted light and basis weight as the characteristics of a normal-smoothness sheet material is not satisfied. Accordingly, when basis weight is determined based on the above-mentioned correlation, there is a concern that basis weight may be erroneously determined. According to the example of FIG. 13, the actual basis weight of the high-smoothness sheet material C is 90 (gsm), but the basis weight of the high-smoothness sheet material C is erroneously determined as 100 (gsm) when the basis weight of the high-smoothness sheet material C is determined using the characteristics of the normal-smoothness sheet material, that is, the correlation between the amount of transmitted light and basis weight of the normal-smoothness sheet material based on the amount of light transmitted through the high-smoothness sheet material C.

For example, a method of determining the smoothness or glossiness of a printing sheet by using an imaging element and determining basis weight by using a correlation between the amount of transmitted light and basis weight conforming to the determined glossiness is also considered. However, since this method may involve an expensive element, such as CMOS, and image processing, costs may be increased due to more complex processing and the like.

An example image forming apparatus may comprise an optical sensor that comprises a light-emitting part (or light-emittor) comprising a light-emitting element (e.g. one or more light-emitting elements) and radiating light to a medium on which a toner image is formed, and a light-receiving part (or light receiver) detecting an amount of transmitted light, an amount of regular reflected light, and an amount of diffuse reflected light; and a glossy sheet-thickness determination unit that determines a weight property of the medium, such as a basis weight or thickness of the medium, wherein the glossy sheet-thickness determination unit calculates a glossy sheet-thickness coefficient by adding a reflected-light-amount-equivalent value, which is obtained when the amount of regular reflected light is standardized based on the amount of diffuse reflected light, to a transmitted-light-amount-equivalent value that is based on the amount of transmitted light, and determines the weight property (e.g. basis weight or thickness) of the medium by using the glossy sheet-thickness coefficient.

In some examples, the image forming apparatus may further comprise: a compensation table in which an initial calibration-compensation coefficient depending on light-emitting properties of the light-emitting element is associated in advance, wherein the glossy sheet-thickness determination unit calculates the reflected-light-amount-equivalent value based on the initial calibration-compensation coefficient and a value of the amount of regular reflected light that is standardized using the amount of diffuse reflected light.

In some examples, the image forming apparatus may further comprise: a compensation table in which a conveying path width-compensation coefficient depending on a distance between the light-emitting element and any one of light-receiving sensors detecting the amount of transmitted light, the amount of regular reflected light, and the amount of diffuse reflected light is associated in advance, wherein a sensor that measures the distance between the light-emitting element and any one of the light-receiving sensors or an input unit that receives an input of an information corresponding to the distance between the light-emitting element and any one of the light-receiving sensors is provided, or the information corresponding to the distance between the light-emitting element and any one of the light-receiving sensors is set in advance, so that the conveying path width-compensation coefficient is determined, and the glossy sheet-thickness determination unit calculates the transmitted-light-amount-equivalent value based on the conveying path width-compensation coefficient and the amount of transmitted light.

In some examples, the glossy sheet-thickness determination unit may calculate the glossy sheet-thickness coefficient by the following equation:

Glossy sheet-thickness coefficient=(the amount of transmitted light˜$Kgm$)+$Ka$\{(the amount of regular reflected light/the amount of diffuse reflected light)−1\} [Equation 1]

where $Kgm$ denotes the conveying path width-compensation coefficient that is determined depending on a distance between the light-emitting element and any one of the light-receiving sensors detecting the amount of regular reflected light, the amount of diffuse reflected light, and the amount of transmitted light, and $Ka$ denotes an initial calibration-compensation coefficient that is determined depending on light-emitting properties of the light-emitting element.

In some examples, the image forming apparatus may further comprise: a glossy sheet-determination unit that calculates a glossy sheet-determination coefficient by adding the reflected-light-amount-equivalent value, which is obtained when the amount of regular reflected light is standardized based on the amount of diffuse reflected light, to a regular reflected-light-amount-equivalent value based on the amount of regular reflected light, and determines whether or not the medium is a glossy sheet by using the glossy sheet-determination coefficient.

In some examples, the image forming apparatus may further comprise: a compensation table in which an initial calibration-compensation coefficient depending on light-emitting properties of the light-emitting element is associated in advance, wherein the glossy sheet-determination unit calculates the reflected-light-amount-equivalent value based on the initial calibration-compensation coefficient and a value of the amount of regular reflected light that is standardized using the amount of diffuse reflected light.

In some examples, the image forming apparatus may further comprise: a compensation table in which a conveying path width-compensation coefficient depending on a distance between the light-emitting element and any one of light-receiving sensors detecting the amount of transmitted light, the amount of regular reflected light, and the amount of diffuse reflected light is associated in advance, wherein a sensor that measures the distance between the light-emitting element and any one of the light-receiving sensors or an input unit that receives an input of an information corresponding to the distance between the light-emitting element and any one of the light-receiving sensors is provided, or the information corresponding to the distance between the light-emitting element and any one of the light-receiving sensors is set in advance, so that the conveying path width-compensation coefficient is determined, and the glossy sheet-determination unit calculates the regular reflected-light-amount-equivalent value based on the conveying path width-compensation coefficient and the amount of regular reflected light.

In some examples, the glossy sheet-determination unit may calculate the glossy sheet-determination coefficient by the following equation.

Glossy sheet-determination coefficient=(the amount of regular reflected light˜$Kgr$)+$Ka$\{(the amount of regular reflected light/the amount of diffuse reflected light)−1\} [Equation 2]

where $Kgr$ denotes the conveying path width-compensation coefficient that is determined depending on a distance between the light-emitting element and any one of the light-receiving sensors detecting the amount of regular reflected light, the amount of diffuse reflected light, and the amount of transmitted light, and $Ka$ denotes an initial calibration-compensation coefficient that is determined depending on light-emitting properties of the light-emitting element.

In some examples, the image forming apparatus may further comprise: a plain sheet-thickness determination unit that calculates a compensated amount of transmitted light by standardizing the amount of transmitted light based on the amount of diffuse reflected light, calculates a compensated amount of reflected light by standardizing the amount of regular reflected light based on the amount of diffuse reflected light, calculates a plain sheet-thickness coefficient by adding the compensated amount of transmitted light to the compensated amount of reflected light, and determines the basis weight or thickness of the medium by using the plain sheet-thickness coefficient, wherein the glossy sheet-thickness determination unit determines the weight property of the medium, (e.g. the basis weight or thickness of the medium) when the glossy sheet-determination unit determines that the medium is a glossy sheet, and the plain sheet-thickness determination unit determines the weight property of the medium, (e.g. basis weight or thickness) of the medium when it is determined that the medium is a plain sheet.

In some examples, the image forming apparatus may further comprise: a compensation table in which an initial calibration-compensation coefficient depending on light-emitting properties of the light-emitting element is associated in advance, wherein the plain sheet-thickness determination unit calculates the compensated amount of reflected light based on the initial calibration-compensation coefficient and a value of the amount of regular reflected light that is standardized using the amount of diffuse reflected light.

In some examples, the image forming apparatus may further comprise: a compensation table in which a conveying path width-compensation coefficient depending on a distance between the light-emitting element and any one of light-receiving sensors detecting the amount of transmitted light, the amount of regular reflected light, and the amount of diffuse reflected light is associated in advance, wherein a sensor that measures the distance between the light-emitting element and any one of the light-receiving sensors or an input unit that receives an input of an information corresponding to the distance between the light-emitting element and any one of the light-receiving sensors is provided, or the information corresponding to the distance between the light-emitting element and any one of the light-receiving sensors is set in advance, so that the conveying path width-compensation coefficient is determined, and the plain sheet-thickness determination unit calculates the compensated amount of transmitted light by standardizing the amount of transmitted light based on the conveying path width-compensation coefficient and the amount of diffuse reflected light.

In some examples, the plain sheet-thickness determination unit may calculate the plain sheet-thickness coefficient by the following equation.

$$\text{Plain sheet-thickness coefficient} = \text{the amount of transmitted light}/(\text{the amount of diffuse reflected light}\hat{\,}Km) + Ka\{(\text{the amount of regular reflected light/the amount of diffuse reflected light}) - 1\} \quad [\text{Equation 3}]$$

where Km denotes the conveying path width-compensation coefficient that is determined depending on a distance between the light-emitting element and any one of the light-receiving sensors detecting the amount of regular reflected light, the amount of diffuse reflected light, and the amount of transmitted light, and Ka denotes an initial calibration-compensation coefficient that is determined depending on light-emitting properties of the light-emitting element.

In some examples, the optical sensor may comprise one light-receiving sensor that rotationally moves around a measurement point as a center, which is an intersection point between an optical axis of the light-emitting element and the medium, in a measurement plane as a plane perpendicular to the medium and including the optical axis, and the light-receiving sensor measures the amount of transmitted light at a regular transmission angle, measures the amount of regular reflected light at a regular reflection angle, and measures the amount of diffuse reflected light at a diffuse reflection angle.

In some examples, the optical sensor may comprise a first light-receiving sensor and a second light-receiving sensor that rotationally moves around a measurement point as a center, which is an intersection point between an optical axis of the light-emitting element and the medium, in a measurement plane as a plane perpendicular to the medium and including the optical axis, and the first light-receiving sensor measures the amount of transmitted light at a regular transmission angle, and the second light-receiving sensor measures the amount of regular reflected light at a regular reflection angle, and measures the amount of diffuse reflected light at a diffuse reflection angle.

An example thickness determination method of determining a basis weight or thickness (weight property) of a medium on which a toner image is formed in an image forming apparatus, may comprise: radiating detection light to the medium and detecting an amount of transmitted light, an amount of regular reflected light, and an amount of diffuse reflected light; calculating a glossy sheet-thickness coefficient by adding a reflected-light-amount-equivalent value, which is obtained when the amount of regular reflected light is standardized based on the amount of diffuse reflected light, to a transmitted-light-amount-equivalent value that is based on the amount of transmitted light, and determining the basis weight or thickness of the medium by using the glossy sheet-thickness coefficient.

In some examples, the glossy sheet-thickness coefficient may be calculated by the following equation.

$$\text{Glossy sheet-thickness coefficient} = (\text{the amount of transmitted light}\hat{\,}Kgm) + Ka\{(\text{the amount of regular reflected light/the amount of diffuse reflected light}) - 1\} \quad [\text{Equation 4}]$$

where, Kgm denotes a conveying path width-compensation coefficient that is determined depending on a distance between a light-emitting element and any one of light-receiving sensors detecting the amount of regular reflected light, the amount of diffuse reflected light, and the amount of transmitted light, and Ka denotes an initial calibration-compensation coefficient that is determined depending on light-emitting properties of the light-emitting element.

In some examples, the thickness determination method may further comprises: calculating a glossy sheet-determination coefficient by adding the reflected-light-amount-equivalent value, which is obtained when the amount of regular reflected light is standardized based on the amount of diffuse reflected light, to a regular reflected-light-amount-equivalent value that is based on the amount of regular reflected light, and determining whether or not the medium is a glossy sheet by using the glossy sheet-determination coefficient.

In some examples, the glossy sheet-determination coefficient may be calculated by the following equation.

$$\text{Glossy sheet-determination coefficient} = (\text{the amount of regular reflected light}\hat{\,}Kgr) + Ka\{(\text{the amount of regular reflected light/the amount of diffuse reflected light}) - 1\} \quad [\text{Equation 5}]$$

where, Kgr denotes a conveying path width-compensation coefficient that is determined depending on a distance between the light-emitting element and any one of light-receiving sensors detecting the amount of regular reflected light, the amount of diffuse reflected light, and the amount of transmitted light, and Ka denotes an initial calibration-compensation coefficient that is determined depending on light-emitting properties of the light-emitting element.

In some examples, the thickness determination method may further comprise: determining the basis weight or thickness of the medium by using the glossy sheet-thickness coefficient when it is determined when determining whether or not the medium is a glossy sheet that the medium is the glossy sheet; and calculating a compensated amount of transmitted light by standardizing the amount of transmitted light based on the amount of diffuse reflected light, calculating a compensated amount of reflected light by standardizing the amount of regular reflected light based on the amount of diffuse reflected light, calculating a plain sheet-thickness coefficient by adding the compensated amount of transmitted light to the compensated amount of reflected light, and determining the basis weight or thickness of the medium by using the plain sheet-thickness coefficient, when it is determined that the medium is a plain sheet.

In some examples, the plain sheet-thickness coefficient may be calculated by the following equation.

Plain sheet-thickness coefficient=the amount of transmitted light/(the amount of diffuse reflected light˜Km)+Ka{(the amount of regular reflected light/the amount of diffuse reflected light)−1}   [Equation 6]

where Km denotes a conveying path width-compensation coefficient that is determined depending on a distance between the light-emitting element and any one of light-receiving sensors detecting the amount of regular reflected light, the amount of diffuse reflected light, and the amount of transmitted light, and Ka denotes an initial calibration-compensation coefficient that is determined depending on light-emitting properties of the light-emitting element.

Example image forming apparatus and example thickness determination methods may calculate a glossy sheet-thickness coefficient by adding a reflected-light-amount-equivalent value, which is obtained when the amount of regular reflected light is standardized based on the amount of diffuse reflected light, to a transmitted-light-amount-equivalent value that is based on the amount of transmitted light, and may determine the basis weight or thickness (weight property) of a medium by using the glossy sheet-thickness coefficient. Even though the amount of transmitted light fluctuates based on the influence of the smoothness or glossiness of a printing sheet, the degree of compression of a printing sheet, and the like, a fluctuation in the amount of transmitted light can be compensated with a reflected light component. Accordingly, it is possible to suppress the influence of a detection-inhibiting factor, such as the smoothness or glossiness of a printing sheet, and to detect accurate basis weight or thickness.

FIG. 1 is a schematic diagram illustrating a portion of an example image forming apparatus. In FIG. 1, a sheet tray 1 is a container that stores printing sheets (mediums which toner images are to be formed on the surfaces thereof). Pickup rollers 2 are rollers that pick up the printing sheet stored in the sheet tray 1. Feed rollers 3 are rollers that convey the printing sheet, which is picked up by the pickup rollers 2, along a sheet conveying path 4. A medium sensor 5 is an optical sensor that includes two sensor units 5a and 5b installed near the sheet conveying path 4 for a printing sheet and detects the printing sheet being conveyed.

Back surface conveying-path rollers 6 are rollers that convey a printing sheet, which has been subjected to one-side printing, along a back surface conveying path 7 during double-side printing. The sheet conveying path 4 and the back surface conveying path 7 join at a junction 8, and the printing sheet, which is conveyed by the feed rollers 3, and the printing sheet, which is conveyed by the back surface conveying-path rollers 6, pass through the junction 8. Registration rollers 9 are rollers that feed the printing sheet, which has passed through the junction 8, to a transfer roller 10. The transfer roller 10 is a roller that is installed at a position facing a photoreceptor drum 11, is rotated while pressing a printing sheet against the photoreceptor drum 11 when the printing sheet is fed to a position between the photoreceptor drum 11 and the transfer roller 10 by the registration rollers 9, and transfers toner to the printing sheet when a bias having polarity reversed to the polarity of the photoreceptor drum 11 is applied to the transfer roller 10. An image forming carrier 12 is a carriage passage that is used to convey the printing sheet to which toner has been transferred by the transfer roller 10.

A microcomputer 13 is a semiconductor device on which a processor, such as a central processing unit (CPU), is mounted and performs various kinds of processing, such as control processing and calculation processing, of the image forming apparatus. The microcomputer (or processor) 13 has a function to perform processing for acquiring voltage values output from the respective light-receiving sensors of the medium sensor 5, and determining the type of a printing sheet, which is being conveyed, based on the voltage values by executing various programs. Further, the microcomputer 13 has a function to select printing conditions, such as the conveying speed, the transfer condition, and the fixing condition of the printing sheet, and to perform printing processing according to the type of the sheet that is determined in this way.

A weight property of a printing sheet (such as a basis weight or a thickness of the printing sheet, for example) is determined as one of the items of the type of a printing sheet, and accordingly, the microcomputer 13 has a function to determine the basis weight or thickness of a printing sheet based on values output from the respective light-receiving sensors of the medium sensor 5. Accordingly, the microcomputer 13 has a function as a thickness determination unit (e.g. the processor 13 comprises thickness determination instructions which are processor-readable instructions). The microcomputer 13 has a function to determine whether or not the printing sheet is a glossy sheet based on values output from the respective light-receiving sensors, a function to determine the weight property (e.g. basis weight or thickness) of the printing sheet according to a set of instructions for thickness determination for a glossy sheet when the printing sheet is a glossy sheet, and a function to determine the weight property (e.g. basis weight or thickness) of the printing sheet according to a set of instructions for thickness determination for a plain sheet when the printing sheet is a plain sheet. Therefore, the microcomputer (or processor) 13 may have functions as a glossy sheet-determination unit, a glossy sheet-thickness determination unit, and a plain sheet-thickness determination unit. For example, the processor 13 may include processor-readable instructions including glossy sheet-determination instructions, glossy sheet-thickness determination instructions, and plain sheet-thickness determination instructions. The voltage value of each sensor, which represents the amount of received light detected by each light-receiving sensor of the medium sensor 5, is converted to a digital signal from an analog signal by an A/D converter (not illustrated), and is given to the microcomputer 13 as a digital signal.

FIG. 2 is a diagram illustrating the medium sensor 5 (FIG. 1) that is an optical sensor of the example image forming apparatus. A light-emitting part (light-emitting element or light emitter) 21, a regular reflected light-receiving part (regular reflected light-receiving sensor or regular reflected light receiver) 23, and a diffuse reflected light-receiving part (diffuse reflected light-receiving sensor or diffuse reflected light receiver) 24 are mounted on the sensor unit 5a (FIG. 1), and a transmitted light-receiving part (transmitted light-receiving sensor or transmitted light receiver) 22 is mounted on the sensor unit 5b. The light-emitting part 21 is an optical component, such as a light-emitting element, which emits light. The light-emitting part 21 may be formed of a light-emitting element itself, and may be formed of a member including one or more light-emitting elements. For example, a light-emitting diode (LED) can be used as a light-emitting element that has improved performance and is less expensive. The transmitted light-receiving part 22 is installed on substantially the same straight line as the optical path of light emitted from the light-emitting part 21, and detects the amount of transmitted light that is the amount of light, which is transmitted through a printing sheet conveyed along the sheet conveying path 4, of the light emitted from the light-emitting part 21. The regular reflected light-receiving part 23 is installed at a position where the regular reflected light-receiving part 23 can detect the amount of regular reflected light that is the amount of light, which is regular reflected by the printing sheet conveyed along the sheet conveying path 4, of the light emitted from the light-emitting part 21. The diffuse reflected light-receiving part 24 is installed at a position where the diffuse reflected light-receiving part 24 can detect the amount of diffuse reflected light that is the amount of light, which is diffuse reflected by the printing sheet, of the light emitted from the light-emitting part 21.

For example, a photodiode (PD) or a phototransistor (PTr) can be used as each of light-receiving elements forming the transmitted light-receiving part 22, the regular reflected light-receiving part 23, and the diffuse reflected light-receiving part 24. The respective amounts of light, such as the amount of transmitted light, the amount of regular reflected light, and the amount of diffuse reflected light, are treated as voltage values that are output from the respective light-receiving sensors.

FIGS. 3 and 4 are diagrams illustrating tables (compensation tables) about conveying path width-compensation coefficients (Kgr, Kgm, and Km) or an initial calibration-compensation coefficient Ka, and these compensation tables are stored in the memory of the microcomputer 13 or the external memory of the microcomputer 13. The respective compensation tables of FIG. 3 are compensation tables in which the conveying path width-compensation coefficients Kgr (FIG. 3(a)), Kgm (FIG. 3(b)), and Km (FIG. 3(c)) depending on a distance between the light-emitting part 21 and any (for example, the transmitted light-receiving part 22) of the light-receiving parts are associated in advance; and the compensation table of FIG. 4 is a compensation table in which an initial calibration-compensation coefficient Ka depending on the light-emitting properties of the light-emitting part 21 is associated in advance.

The conveying path width-compensation coefficients Kgr, Kgm, and Km are compensation coefficients that are used to compensate a difference in structure based on a difference in the type of the image forming apparatus, and are compensation coefficients that are determined according to a distance between the light-emitting element and the light-receiving sensor. FIG. 3 illustrates an example in which an integer in the range of 1 to 6 is assigned to each of the compensation coefficients Kgr, Kgm, and Km according to a distance between two sensor units 5a and 5b of the medium sensor 5.

The respective compensation tables of FIG. 3 allow an example function to be used in a plurality of types of image forming apparatus. When the medium sensor 5 is mounted on a specific type of an image forming apparatus, the conveying path width-compensation coefficients Kgr, Kgm, and Km are determined from the respective compensation tables based on a distance between the sensor units 5a and 5b of this type of the image forming apparatus. The processing is performed at the time of manufacture of an apparatus, and the like. Accordingly, the values of the conveying path width-compensation coefficients Kgr, Kgm, and Km are stored in the memory of the microcomputer 13 or the external memory of the microcomputer 13.

The initial calibration-compensation coefficient Ka is a compensation coefficient that is used to compensate a difference or a fluctuation in the light-emitting properties of the light-emitting part according to a difference or a fluctuation in the light-emitting properties of the light-emitting part 21. As illustrated in FIG. 4, an example in which an integer in the range of 1 to 6 is assigned to the initial calibration-compensation coefficient Ka according to the compensated amount of emitted light. In this example, 1 and 2 are reserve and are not used here.

The compensated amount of emitted light is a numerical value that represents a compensation ratio of the amount of light in calibration processing for increasing the amount of emitted light that is performed to compensate for the amount of light emitted from the light-emitting part 21 when the amount of light emitted from the light-emitting part 21 is reduced due to, for example, time degradation, a change in temperature, or the like. For example, when the amount of light emitted from the light-emitting part 21 is smaller than a certain value, compensation is performed to increase the amount of light, which is emitted from the light-emitting part 21, by 10%. 10% in this case is the compensated amount of emitted light.

In the processing for compensating the amount of emitted light, for example, the amount of transmitted light is measured when a printing sheet is not present, and is compared with the initial amount of emitted light that is measured in advance. As a result, it is possible to find out how much (%) the amount of emitted light is reduced from the initial amount of emitted light. Compensation (processing for increasing the amount of emitted light) when the amount of emitted light is reduced is performed by the increase of the value of a current, which drives an light emitting LED, or a PWM value, or the like. The processing for calibrating the amount of emitted light is performed when the power of the apparatus is turned on, immediately before the printing processing is performed, at regular intervals, or the like, and the compensated amount of emitted light as the result of the processing is logged.

Robustness against a fluctuation in the amount of light emitted from the light-emitting part 21 may be improved in the example image forming apparatus. Accordingly, even though a fluctuation in the amount of light emitted from the light-emitting part 21 is generated, processing can continue to be performed at a considerable portion without the compensation of the amount of emitted light itself. However, when the amount of emitted light is significantly reduced in excess of a predetermined value, the compensation of the amount of emitted light is performed.

The table of FIG. 4 is setting information that is used to change the initial calibration-compensation coefficient Ka according to the compensated amount of emitted light when the compensation of the amount of emitted light is performed due to a significant fluctuation in the amount of emitted light. For example, the initial value of the initial calibration-compensation coefficient Ka is set to 3.

An example processing for determining the basis weight of a printing sheet in the example image forming apparatus will be described with reference to FIG. 5. The processing may be performed by the microcomputer 13, for example.

FIG. 5 illustrates the example processing for determining the basis weight of a printing sheet. The processing is performed in the printing processing and the like in a state in which a printing sheet is conveyed along the sheet conveying path 4 and is caught by the medium sensor 5, that is, a state in which light emitted from the light-emitting part 21 of the medium sensor 5 is radiated to a printing sheet and light reflected from the printing sheet or light transmitted through the printing sheet is obtained.

At 501, light is radiated to a printing sheet from the light-emitting part 21, so that the amount of light transmitted through the printing sheet, the amount of regular reflected light, and the amount of diffuse reflected light are acquired by the transmitted light-receiving part 22, the regular reflected light-receiving part 23, and the diffuse reflected light-receiving part 24. As described above, outputs from the respective light-receiving parts may be in voltages and voltage values, which are obtained from the A/D conversion of the voltages, are input to the microcomputer 13.

At 502, it is determined whether or not the compensated amount of emitted light is 0 (that is, the amount of emitted light is not increased) or whether or not the compensated amount of emitted light exceeds 20%. The compensated amount of emitted light is logged (is stored in the memory) according to the result of processing for calibrating the amount of emitted light, which is performed separately, and the determination at 502 is performed based on the log (the same may apply to 503 to be described later). If the compensated amount of emitted light is 0, the processing proceeds to 507 to be described later. On the other hand, if the compensated amount of emitted light exceeds 20%, the processing proceeds to 513, error processing is performed, and the processing ends. Since robustness against a fluctuation in the amount of light emitted from the light-emitting part 21 is improved, the compensation of the amount of emitted light is not performed as long as the amount of light emitted from the light-emitting part 21 does not fluctuate from an initial value by 60% (a preset rate of change) or more. When the amount of emitted light fluctuates from an initial value by 60% or more, that is, when the amount of emitted light is reduced to 40 when the initial value is assumed to be 100, processing for increasing the amount of emitted light is performed for the first time. In an example, the compensated amount of emitted light is set in the range of 0 to 5% when the amount of emitted light is reduced to the range of 35 to 40 when the initial value is assumed to be 100, the compensated amount of emitted light is set in the range of 5 to 10% when the amount of emitted light is reduced to the range of 30 to 35 when the initial value is assumed to be 100, and the compensated amount of emitted light is set in the range of 10 to 20% when the amount of emitted light is reduced to the range of 20 to 30 when the initial value is assumed to be 100.

For example, when the compensated amount of emitted light exceeds 20%, the amount of light emitted from the light-emitting part 21 may fluctuate from an initial value by 80% (a preset upper limit) or more. In this case, it is determined that the life of the light-emitting element of the light-emitting part 21 comes to an end or a failure occurs in the light-emitting element of the light-emitting part 21, and the error processing (513) is performed. The error processing includes processing, such as the stop of the printing processing, the display of a warning, or the log of error contents.

If the compensated amount of emitted light is not 0 and does not exceed 20%, the processing proceeds to 503 (502: No→503). The processing of 503, 504, 505 and 506 includes processing for changing the initial calibration-compensation coefficient Ka based on the setting of the compensation table (FIG. 4) according to the value of the compensated amount of emitted light. If the value of the compensated amount of emitted light is larger than 0 and equal to or smaller than 5%, the initial calibration-compensation coefficient Ka is set to 4 (503→504). If the value of the compensated amount of emitted light is larger than 5% and equal to or smaller than 10%, the initial calibration-compensation coefficient Ka is set to 5 (503→505). If the value of the compensated amount of emitted light is larger than 10% and equal to or smaller than 20%, the initial calibration-compensation coefficient Ka is set to 6 (503→506).

Since the processing for changing the initial calibration-compensation coefficient Ka in 503, 504, 505, 506 is skipped (502→507) if the compensated amount of emitted light is 0, the value of the initial calibration-compensation coefficient Ka is 3 (initial value). When the processing of 501 to 513 is performed once has been described here, but processing for returning Ka to 3 needs to be performed after 509 to 512 when the processing repeated after the first time is considered.

At 507, after the initial calibration-compensation coefficient Ka is determined at 502 to 506, a glossy sheet-determination coefficient $K_{glossness}$ is calculated based on the following equation. In the following equation, $V_{ref}$ denotes the amount of regular reflected light, $V_{diff}$ denotes the amount of diffuse reflected light, Kgr denotes the conveying path width-compensation coefficient (FIG. 3(a)), and Ka denotes the initial calibration-compensation coefficient. Each amount of light is a value that is obtained from the A/D conversion of the voltage output from each light-receiving part.

$$K_{glossness}=V_{ref} \cdot Kgr+Ka\{(V_{ref}/V_{diff})-1\} \quad [\text{Equation 7}]$$

The example image forming apparatus suppresses the influence of a detection-inhibiting factor, such as the smoothness or glossiness of a printing sheet, and can more accurately detect basis weight, in order to compensate for a fluctuation of the amount of transmitted light based on the smoothness of a sheet, with a reflected light component.

The detection of the basis weight of a printing sheet using optical sensors is performed using the fact that a certain correlation is present between the amount of transmitted light and basis weight. For example, as shown in FIGS. 12 and 13, basis weight is determined based on the fact that a correlation is present between the amount of transmitted light and basis weight, and based on the amount of transmitted light detected. However, in the case of a high-smoothness sheet material having relatively high smoothness or glossiness of a surface, the amount of regular reflected light and the amount of diffuse reflected light tend to be increased and the amount of transmitted light tends to be reduced in comparison with a sheet material having normal smoothness. Accordingly, a correlation between the amount of transmitted light and basis weight of the high-smoothness sheet material is different from that of the sheet material having normal smoothness. For this reason, when the basis weight of the high-smoothness sheet material is determined based on the correlation between the amount of transmitted light and the basis weight of the sheet material having normal smoothness, there is a concern that the basis weight of the high-smoothness sheet material may be erroneously determined.

In contrast, the example image forming apparatus compensates the reduced amount of transmitted light with the amount of reflected light by using a phenomenon in which the amount of transmitted light is reduced and the amount of regular reflected light and the amount of diffuse reflected light are increased in the case of a high-smoothness sheet material. Accordingly, the image forming apparatus can determine the basis weights of printing sheets having different smoothness or glossiness of a surface. For example, the image forming apparatus can detect basis weight with improved robustness against detection-inhibiting factors, such as the smoothness and glossiness of a printing sheet.

However, examples of the printing sheet include various kinds of printing sheets, such as a printing sheet of which the smoothness of a surface is increased by the pressing of a plain sheet (a printing sheet of which the smoothness is higher than the smoothness of a so-called plain sheet but does not reach the smoothness of a glossy sheet) and a glossy sheet of which the surface is coated with a coating agent. For this reason, it is difficult to determine the basis weights and thicknesses of all these printing sheets based on one reference.

Accordingly, in the example image forming apparatus, whether a printing sheet is a plain sheet or a glossy sheet is determined first, a set of instructions for thickness determination for a glossy sheet is used when the printing sheet is a glossy sheet, and a set of instructions for thickness determination for a plain sheet is used when the printing sheet is a plain sheet. Equation 7 is to calculate a glossy sheet-determination coefficient $K_{glossness}$ that is used to determine whether a printing sheet is a plain sheet or a glossy sheet, and is to calculate a glossy sheet-determination coefficient $K_{glossness}$ by adding a reflected-light-amount-equivalent value, which is obtained when the amount of regular reflected light is standardized based on the amount of diffuse reflected light, to a regular reflected-light-amount-equivalent value that is based on the amount of regular reflected light.

FIG. 6 is a graph showing a correlation between a glossy sheet-determination coefficient, which is calculated by Equation 7, and glossiness in regard to various sheet materials (two kinds of plain sheets and thirteen glossy sheets having different glossiness). FIG. 6 shows to an example case in which Kgr is 3 and Ka is 3 in Equation 7. Generally, a measured value of Gloss60° measurement, which is one of methods of measuring glossiness, is 8% or less in the case of a plain sheet and is 20% or more in the case of a glossy sheet. Here, a sheet of which the measured value of Gloss60° measurement is 10.5% or more is treated as a glossy sheet. As shown in FIG. 6, it is found that whether a printing sheet is a plain sheet or a glossy sheet can be accurately determined according to whether or not a glossy sheet-determination coefficient $K_{glossness}$ is 2.1 or more.

With reference to FIG. 5, after the processing for calculating a glossy sheet-determination coefficient $K_{glossness}$ at 507, it is determined whether or not the glossy sheet-determination coefficient $K_{glossness}$ is 2.1 or more (508). As described above, it is determined whether a printing sheet is a plain sheet or a glossy sheet. As an example, a threshold value is 2.1, and is determined based on the structure of the medium sensor 5 and other apparatus (a difference in each compensation coefficient based on this structure) or the specifications of a sheet to be determined, and the like.

As the result of the determination, if the glossy sheet-determination coefficient $K_{glossness}$ is less than 2.1 (that is, if it is determined that a printing sheet is a plain sheet), the set of instructions for thickness determination for a plain sheet corresponding to 511 and 522 is executed. If the glossy sheet-determination coefficient $K_{glossness}$ is equal to or larger than 2.1 (that is, if it is determined that a printing sheet is a glossy sheet), the basis weight or thickness of the printing sheet is determined according to the set of instructions for thickness determination for a glossy sheet corresponding to 509 and 510.

In the set of instructions for thickness determination for a plain sheet corresponding to 511 and 522, a plain sheet-thickness coefficient $K_{thickness}$ is calculated based on the following equation. In the following equation, $V_{trans}$ denotes the amount of transmitted light, $V_{ref}$ denotes the amount of regular reflected light, $V_{diff}$ denotes the amount of diffuse reflected light, Km denotes the conveying path width-compensation coefficient (FIG. 3(c)), and Ka denotes the initial calibration-compensation coefficient.

$$K_{thickness}=V_{trans}/(V_{diff} \cdot Km)+Ka\{(V_{ref}/V_{diff})-1\} \quad \text{[Equation 8]}$$

The example image forming apparatus may have improved robustness against a fluctuation in the amount of light emitted from a light source (light-emitting part 21) (time degradation or temperature) as well. FIG. 9 is a graph comparing a correlation between the basis weight of a printing sheet and the amount of light transmitted through the printing sheet when the amount of light emitted from a light source fluctuates. Transmission 1, which is plotted with rhombuses in the graph, represents the amount of transmitted light when the light source is in an initial state (the amount of emitted light of 100%), and Transmission 2, which is plotted with squares, represents the amount of transmitted light when the amount of light emitted from the light source is reduced by 60%. A vertical axis represents the amount of transmitted light as a relative value. "The amount of transmitted light as a relative value" may refer to the relative amount of the amount of light, which is transmitted through the printing sheet, relative to a reference value that is determined. As shown in FIG. 9, since the amount of transmitted light is naturally reduced as well when the amount of light emitted from the light source is reduced, a correlation between the amount of transmitted light and basis weight fluctuates as well.

Further, FIG. 10 shows a graph illustrating a fluctuation in the amount of transmitted light and the stability of the value of the amount of transmitted light standardized based on the amount of diffuse reflected light when the amount of light emitted from the light-emitting source fluctuates. The vertical axis of the graph represents an output value (voltage value) of the light-receiving sensor. Since the amount of transmitted light is naturally reduced as well when the amount of light emitted from the light source is reduced, the amount of transmitted light does not conform to the above-mentioned correlation between the amount of transmitted light and basis weight as well.

In an example image forming apparatus compensates (standardizes) the amount of transmitted light based on the amount of reflected light by using the fact that not only the amount of transmitted light but also the amount of regular reflected light and the amount of diffuse reflected light fluctuate likewise when the amount of light emitted from the light source (light-emitting part 21) fluctuates. Accordingly, the example image forming apparatus can more accurately determine the basis weights of a printing sheet even though the amount of light emitted from the light source fluctuates.

As shown in FIG. 10, the amount of transmitted light and the amount of diffuse reflected light fluctuate with a fluctuation in the amount of light emitted from the light source, but the amount of transmitted light, which is standardized using the amount of diffuse reflected light, (standardized voltage (V): plotted with triangles) has stable values. Accordingly, the basis weight may be detected with improved robustness against a detection-inhibiting factor, such as a fluctuation in the amount of light emitted from the light source (light-emitting part 21).

Equation 8 may compensate (add) a value corresponding to transmitted light, which is represented by the first term, (the compensated amount of transmitted light) with (to) a value corresponding to reflected light of the second term (the compensated amount of reflected light) to achieve robustness against a detection-inhibiting factor, such as the above-mentioned smoothness or glossiness of a printing sheet. Further, Equation 8 may standardize the amount of transmitted light of the first term based on the amount of diffuse reflected light and the conveying path width-compensation coefficient Km to achieve robustness against a detection-inhibiting factor, such as a fluctuation in the amount of light emitted from the light source. For example, $V_{trans}/(V_{diff}Km)$ of the first term represents the pure amount of light transmitted through the printing sheet and the detected amount of light, which is diffuse reflected by the surface of the printing sheet, and standardizes the pure amount of transmitted light and the detected amount of diffuse reflected light based on different absolute amounts. Each of the pure amount of transmitted light and the detected amount of diffuse reflected light is converted into an amount standardized using a transient variation, which is obtained at the time of detection of each of the pure amount of transmitted light and the detected amount of diffuse reflected light, as a relative relationship, so that each of the pure amount of transmitted light and the detected amount of diffuse reflected light has a more stable physical property.

Further, $Ka\{(V_{ref}/V_{diff})-1\}$ of the second term represents the surfaceness of the printing sheet, and surface smoothness is higher as a relationship of $V_{ref} > V_{diff}$ is stronger. The example image forming apparatus may have characteristics by which the amount of regular reflected light is more easily detected than the amount of diffuse reflected light due to the structure of the medium sensor 5. Accordingly, when regular reflected components caused by higher smoothness are increased, the image forming apparatus reacts sensitively due to regular reflected components.

As described above, the amount of transmitted light (first term), which is reduced as the smoothness of the printing sheet increases, is compensated (corrected) using a component (second term), which is increased as the smoothness of the printing sheet increases, so as to compensate for a reduction in the amount of transmitted light. Accordingly, the example image forming apparatus achieves robustness against a detection-inhibiting factor, such as the smoothness or glossiness of a printing sheet.

Since the regular reflected light-receiving part 23 receives both regular reflected light and diffuse reflected light, an output value of the regular reflected light-receiving part 23 is a value that represents the sum of the amount of diffuse reflected light and the amount of regular reflected light. For example, since "the output value of the regular reflected light-receiving part 23≅the amount of diffuse reflected light+ the amount of regular reflected light" is obtained, "the amount of regular reflected light≅the output value of the regular reflected light-receiving part 23−the amount of diffuse reflected light" is satisfied. Accordingly, "the amount of regular reflected light/the amount of diffuse reflected light≅ (the output value of the regular reflected light-receiving part 23−the amount of diffuse reflected light)/the amount of diffuse reflected light" is obtained. When the right side of this equation is modified, "(the output value of the regular reflected light-receiving part 23/the amount of diffuse reflected light)−1" is obtained.

For example, "(the amount of regular reflected light/the amount of diffuse reflected light)−1" or "(Vref/Vdiff)−1" of $Ka\{$(the amount of regular reflected light/the amount of diffuse reflected light)$-1\}$ of the second term of Equation 3 (Equation 6) or $Ka\{(Vref/Vdiff)-1\}$ of Equation 8 is the amount of regular reflected light that is standardized based on the amount of diffuse reflected light.

With reference to FIG. 5, after the plain sheet-thickness coefficient $K_{thickness}$ is calculated based on the above-mentioned Equation 8 in 511, the processing proceeds to 512, the basis weight of the printing sheet is determined based on the plain sheet-thickness coefficient $K_{thickness}$, and the processing for determining basis weight ends.

"The basis weight of the printing sheet is determined based on the plain sheet-thickness coefficient $K_{thickness}$" is to determine basis weight, which corresponds to the plain sheet-thickness coefficient $K_{thickness}$ calculated by the above-mentioned processing, based on a correlation between the plain sheet-thickness coefficient $K_{thickness}$ and the basis weight of the printing sheet shown in FIG. 8. FIG. 8 corresponds to a case in which Km is 2 and Ka is 3 in Equation 8.

The plain sheet-thickness coefficient $K_{thickness}$ is a coefficient that represents the basis weight of a printing sheet and has robustness against both a detection-inhibiting factor, such as the smoothness or glossiness of the printing sheet, and a detection-inhibiting factor, such as a fluctuation in the amount of light emitted from the light source. Accordingly, a printing sheet may have a correlation, which has robustness against the two inhibiting factors, between the plain sheet-thickness coefficient $K_{thickness}$ and basis weight. For example, as shown in FIG. 8, both a sheet material having normal smoothness ($K_{thickness}$_nomal) and a sheet material having higher smoothness ($K_{thickness}$_low) in a plain sheet may have the same correlation, and basis weight can be determined based on this correlation. The correlation between the plain sheet-thickness coefficient $K_{thickness}$ and basis weight is set in the apparatus in advance, and may be set as a table and may be set as an equation.

As the result of the determination of whether a printing sheet is a plain sheet or a glossy sheet in 507 and 508, if the printing sheet is a glossy sheet, the basis weight or thickness of the printing sheet is determined according to the set of instructions for thickness determination for a glossy sheet corresponding to 509 and 510.

In 509, a glossy sheet-thickness coefficient $KG_{thickness}$ is calculated based on the following equation 9. Equation 9 is to calculate the glossy sheet-thickness coefficient $KG_{thickness}$ by adding the reflected-light-amount-equivalent value (the second term of a right side), which is obtained when the amount of regular reflected light is standardized based on the amount of diffuse reflected light, to a transmitted-light-amount-equivalent value (the first term of the right side) that is based on the amount of transmitted light.

In the following equation, $V_{trans}$ denotes the amount of transmitted light, $V_{ref}$ denotes the amount of regular reflected light, $V_{diff}$ denotes the amount of diffuse reflected light, Kgm denotes the conveying path width-compensation coefficient (FIG. 3(b)), and Ka denotes the initial calibration-compensation coefficient.

$$KG_{thickness} = V_{trans}\hat{}Kgm + Ka\{(V_{ref}/V_{diff})-1\} \quad \text{[Equation 9]}$$

Similarly to the case of the above-mentioned plain sheet-thickness coefficient $K_{thickness}$ of Equation 8, the glossy sheet-thickness coefficient $KG_{thickness}$ of Equation 9 is a coefficient that is devised to have robustness against a detection-inhibiting factor, such as the smoothness or glossiness of a printing sheet, and is a coefficient that is optimized for the detection of the thickness of, particularly, a glossy sheet. For example, Equation 9 is optimized for the detection of the thickness of a glossy sheet (a coated sheet subjected to surface treatment or the like) of which transmittance is lower.

After the glossy sheet-thickness coefficient $KG_{thickness}$ is calculated at 509, the processing proceeds to 510, the basis weight of the printing sheet is determined based on the glossy sheet-thickness coefficient $KG_{thickness}$, and the processing for determining basis weight ends. "The basis weight of the printing sheet is determined based on the glossy sheet-thickness coefficient $KG_{thickness}$" is to determine basis weight, which corresponds to the glossy sheet-thickness coefficient $KG_{thickness}$ calculated by the processing, based on a correlation between the glossy sheet-thickness coefficient $KG_{thickness}$ and the basis weight of the printing sheet shown in FIG. 7. FIG. 7 is a graph showing a relationship between $KG_{thickness}$, which is calculated based on Equation 9, and basis weight about 13 kinds of glossy sheets. FIG. 7 corresponds to a case in which Kgm is 3 and Ka is 3 in Equation 9.

The glossy sheet-thickness coefficient $KG_{thickness}$ is a coefficient that represents the basis weight of a printing sheet and has robustness against a detection-inhibiting factor, such as the smoothness or glossiness of the printing sheet. Accordingly, a printing sheet may have a correlation, which has robustness against the detection-inhibiting factor, between the glossy sheet-thickness coefficient $KG_{thickness}$ and basis weight. For example, as shown in FIG. 7, all the various glossy sheets may have the same correlation, and basis weight can be determined based on this correlation.

The correlation between the glossy sheet-thickness coefficient $KG_{thickness}$ and basis weight is set in the apparatus in advance, and may be set as a table, an equation, or the like.

As described above, according to the example image forming apparatus, whether a printing sheet is a plain sheet or a glossy sheet can be accurately determined based on Equation 7, a set of instructions for thickness determination for a plain sheet is used when the printing sheet is a plain sheet, and a set of instructions for thickness determination for a glossy sheet is used when the printing sheet is a glossy sheet.

Since the respective sets of instructions for thickness determination are optimized for a plain sheet and a glossy sheet respectively, the sets of instructions for thickness determination can detect basis weight with improved robustness against detection-inhibiting factors, such as the smoothness and glossiness of a printing sheet. Accordingly, example image forming apparatus have improved robustness against detection-inhibiting factors, such as the smoothness and glossiness of a printing sheet, by only the optical sensor without requiring additional members, such as separate imaging elements.

The apparatus, which uses a set of instructions for thickness determination for a plain sheet and a set of instructions for thickness determination for a glossy sheet after determining whether a printing sheet is a plain sheet or a glossy sheet has been described by way of example, but an apparatus using only a set of instructions for thickness determination for a plain sheet or an apparatus using only a set of instructions for thickness determination for a glossy sheet may be used as the apparatus, for example.

An apparatus calculating the respective coefficients by using voltage values, which are values output from the respective light-receiving parts, as values representing the respective amounts of light, such as the amount of transmitted light, the amount of diffuse reflected light, and the amount of regular reflected light, has been described by way of example. For example, the apparatus uses values (voltage values) output from the respective light-receiving parts as values of the amount of transmitted light, the amount of diffuse reflected light, and the amount of regular reflected light in Equations 1 to 3 (Equations 4 to 6 and Equations 7 to 9). For example, standardized values of values, which are output from the respective light-receiving parts, may be used as values representing the respective amounts of light in Equations 1 to 3 (Equations 4 to 6 and Equations 7 to 9), and the amount of transmitted light as a relative value may be used, and the like.

"Each of standardized values of values, which are output from the respective light-receiving parts," is a ratio of a value, which is output from the light-receiving part when a printing sheet as an object to be measured is interposed, to a value that is output from the light-receiving part when light is received without a sheet interposed, or a value that is output from the light-receiving part when a reference sheet is interposed. Further, "the amount of transmitted light as a relative value" may refer to the amount of light, which is transmitted through a printing sheet, (a value that is output from the light-receiving part) relative to a reference value that is determined.

Example image forming apparatus and example methods compensate for a fluctuation in the amount of transmitted light with a reflected light component by using values that can represent the respective amounts of light, such as the amount of transmitted light, the amount of diffuse reflected light, and the amount of regular reflected light. Accordingly, for example, the amount of transmitted light, the amount of diffuse reflected light, and the amount of regular reflected light in Equations 1 to 3 (Equations 4 to 6) may include values (for example, lumen and the like) that directly represent the amounts of light, or may include values which can correspond to the respective amounts of light, such as voltage values that are values output from the respective light-receiving parts described above, or standardized values.

Further, when the conveying path width-compensation coefficients (Kgr, Kgm, and Km) are preset in the apparatus by calibration or the like of manufacturing processes has been described by way of example. For example, a sensor that measures a distance between the light-emitting element and any one of the light-receiving sensors or an input unit that receives the input of information corresponding to a distance between the light-emitting element and any one of the light-receiving sensors may be provided, and the conveying path width-compensation coefficients (Kgr, Kgm, and Km) may be set with reference to the respective compensation tables (FIGS. 3(a) to 3(c)) based on a distance between the sensors that is obtained from the sensor or the input unit. In addition, "information corresponding to a distance between the light-emitting element and any one of the light-receiving sensors" to be input may be information that allows a distance between sensors to be determined based on the input of a product name, a model number, or the like when the apparatus includes, for example, a table in which product names, model numbers, or the like are associated with distances between sensors. In this case, a product name, a model number, or the like is "information corresponding to a distance between the light-emitting element and any one of the light-receiving sensors". Furthermore, the input unit may be a user interface that receives an input from a human being (a service man, a user, or the like), and may be an interface that receives an input from an external device (it does not matter whether the interface is a wired interface or a wireless interface).

Moreover, the conveying path width-compensation coefficients (Kgr, Kgm, and Km) or the initial calibration-compensation coefficient Ka may be determined in consideration of the respective characteristics of the apparatus, and arithmetic methods for the first term and the second term of Equations 1 to 3 (Equations 4 to 6 and Equations 7 to 9) may also be changed according to the determination of the numerical values thereof. For example, arithmetic methods, such as addition, subtraction, multiplication, division, and exponentiation, may be changed according to methods of determining the conveying path width-compensation coefficients (Kgr, Kgm, and Km) or the initial calibration-compensation coefficient Ka, the characteristics of the apparatus, or the like. Compensation, which uses the conveying path width-compensation coefficients (Kgr, Kgm, and Km) or the initial calibration-compensation coefficient Ka, is compensation for processing for determining basis weight, which is based on the above-mentioned conception, to be accurately or efficiently performed in example apparatus; and is optimized so as to correspond to individual example apparatus. Accordingly, the compensation, which uses the conveying path width-compensation coefficients (Kgr, Kgm, and Km) or the initial calibration-compensation coefficient Ka, may not be performed in some cases.

A case in which basis weight is determined has been described as an example, but a thickness may be determined. The correlation may be switched from a correlation between each thickness coefficient and the basis weight of a printing sheet, which is shown in FIGS. 7 and 8, and a printing sheet may have the correlation between each thickness coefficient and the thickness of a printing sheet.

A case in which the medium sensor (optical sensor) includes the transmitted light-receiving part (transmitted light-receiving sensor), the regular reflected light-receiving part (regular reflected light-receiving sensor), and the diffuse reflected light-receiving part (diffuse reflected light-receiving sensor), and the respective sensors detect the amount of transmitted light, the amount of regular reflected light, and the amount of diffuse reflected light has been described by way of example. However, the number of sensors for detecting the amount of transmitted light, the amount of regular reflected light, and the amount of diffuse reflected light may be one or two.

FIG. 11 is a diagram illustrating a medium sensor that includes two light-receiving sensors. In this example, the medium sensor includes a transmitted light-receiving part 22' (first light-receiving sensor) and a reflected light-receiving part 23' (second light-receiving sensor). The transmitted light-receiving part 22' and the reflected light-receiving part 23' may be rotationally movable around a measurement point, which is an intersection point between an optical axis of the light-emitting part 21 and a printing sheet, in a measurement plane that is a plane perpendicular to the printing sheet and including the optical axis. As illustrated in FIG. 11, the transmitted light-receiving part 22' may be rotationally movable in a range that is the side of the printing sheet opposite to the light-emitting part 21, and the reflected light-receiving part 23' may be rotationally movable in a range that is the side of the printing sheet on which the light-emitting part 21 is positioned.

The medium sensor having this structure measures the amount of received light while rotationally moving the transmitted light-receiving part 22' in a predetermined range (for example, the range of 20 to 70° as illustrated in FIG. 11); and acquires a peak value in the predetermined range as the amount of transmitted light. Likewise, the medium sensor having this structure measures the amount of received light while rotationally moving the reflected light-receiving part 23' in a predetermined range (for example, the range of 20 to 70° as illustrated in FIG. 11); acquires a peak value in the predetermined range as the amount of regular reflected light; and uses a selected value as the amount of diffuse reflected light (for example, uses a value measured at a predetermined angle).

The amount of received light may be measured while a printing sheet is conveyed in the processing for measuring the amount of received light while rotationally moving the transmitted light-receiving part 22' or the reflected light-receiving part 23'. However, when it is difficult to measure the amount of received light in this way due to a relationship between the rotational moving speed of the light-receiving part and the conveying speed of the printing sheet, the amount of received light is measured in a state in which the conveyance of the printing sheet is stopped (or the conveying speed of the printing sheet is reduced).

With one sensor which detects the amount of regular reflected light and the amount of diffuse reflected light, as illustrated in FIG. 11, it is possible to reduce the number of light-receiving sensors and it is not necessary to compensate a ratio between the amount of regular reflected light and the amount of diffuse reflected light. Further, since the amount of received light is detected over the predetermined range (for example, the range of 20 to 70° as illustrated in FIG. 11), the peak value in the predetermined range can be accurately acquired. Further, since the profile of the amount of light in the predetermined range can be obtained, this information can also be used for the determination of the type of a sheet, and the like.

Two light-receiving sensors formed of the transmitted light-receiving part 22' (first light-receiving sensor) and the reflected light-receiving part 23' (second light-receiving sensor), have been described in FIG. 11 by way of example, but one light-receiving sensor, which may be rotationally movable from the side of the printing sheet on which the light-emitting part 21 is positioned to the opposite side, may be provided. In this case, when it is difficult for the light-receiving sensor to rotationally move while going over a printing sheet, the amount of received light on the opposite side may be detected at the time of the next printing sheet after the printing sheet is conveyed. The successive printing sheets may need to be the same type of sheets in this case.

Further, when the light-receiving parts are rotationally moved has been described above, but the light-emitting part may be rotationally movable (to be rotationally moved around a measurement point, which is an intersection point between the optical axis of the light-emitting part and a printing sheet, in a measurement plane that is a plane perpendicular to the printing sheet and including the optical axis).

It is to be understood that not all aspects, advantages and features described herein may necessarily be achieved by, or included in, any one particular example. Indeed, having described and illustrated various examples herein, it should be apparent that other examples may be modified in arrangement and detail.

LIST OF REFERENCE NUMBERS

5: medium sensor (optical sensor), 13: microcomputer or processor (glossy sheet-determination unit or glossy sheet-determination instructions; glossy sheet-thickness determination unit or glossy sheet-thickness determination instructions; and plain sheet-thickness determination unit or plain sheet-thickness determination instructions), 21: light-emitting part (light-emitting element), 22: transmitted light-receiving part (transmitted light-receiving sensor) 23: regular reflected light-receiving part (regular reflected light-receiving sensor), 24: diffuse reflected light-receiving part (diffuse reflected light-receiving sensor).

The invention claimed is:

1. An image forming apparatus comprising:
   an optical sensor comprising a light emitter to radiate light to a medium on which a toner image is formed, and a light receiver to detect an amount of transmitted light, an amount of regular reflected light, and an amount of diffuse reflected light; and
   a processor to:
      calculate a glossy sheet-thickness coefficient by adding a reflected-light-amount-equivalent value to a transmitted-light-amount-equivalent value, wherein the reflected-light-amount-equivalent value is obtained when the amount of regular reflected light is standardized based on the amount of diffuse reflected light, and wherein the transmitted-light-amount-equivalent value is based on the amount of transmitted light,
      determine a weight property of the medium based on the glossy sheet-thickness coefficient, wherein the weight property comprises a basis weight or a thickness of the medium, and
      select a printing condition according to the weight property of the medium and perform a printing process using the selected printing condition.

2. The image forming apparatus according to claim 1, wherein the processor is to:
   determine an initial calibration-compensation coefficient based on a compensation table which correlates the initial calibration-compensation coefficient with light-emitting properties of the light emitter, and
   calculate the reflected-light-amount-equivalent value based on the initial calibration-compensation coefficient and a value of the amount of regular reflected light that is standardized based on the amount of diffuse reflected light.

3. The image forming apparatus according to claim 1, wherein the light receiver comprises a light-receiving sensor to detect the amount of transmitted light, the amount of regular reflected light, or the amount of diffuse reflected light, and
   wherein the processor is to:
      receive a distance between the light emitter and the light-receiving sensor,
      determine a conveying path width-compensation coefficient based on a compensation table which correlates the conveying path width-compensation coefficient with the distance between the light emitter and the light-receiving sensor, and
      calculate the transmitted-light-amount-equivalent value based on the conveying path width-compensation coefficient and the amount of transmitted light.

4. The image forming apparatus according to claim 1, wherein the light receiver comprises a light-receiving sensor to detect the amount of transmitted light, the amount of regular reflected light, or the amount of diffuse reflected light, and
   wherein the processor is to calculate the glossy sheet-thickness coefficient with the following equation:

Glossy sheet-thickness coefficient=(the amount of transmitted light·$Kgm$)+$Ka$\{(the amount of regular reflected light/the amount of diffuse reflected light)−1\} wherein, $Kgm$ represents a conveying path width-compensation coefficient that is determined based on a distance between the light emitter and the light-receiving sensor, and $Ka$ represents an initial calibration-compensation coefficient that is determined depending on light-emitting properties of the light emitter.

5. The image forming apparatus according to claim 1, wherein the processor comprises processor readable instructions including glossy sheet-determination instructions to calculate a glossy sheet-determination coefficient by adding the reflected-light-amount-equivalent value to a regular reflected-light-amount-equivalent value,
   wherein the reflected-light-amount-equivalent value is based on the amount of regular reflected light, and
   wherein the glossy sheet-determination instructions comprise instructions to determine whether or not the medium is a glossy sheet based on the glossy sheet-determination coefficient.

6. The image forming apparatus according to claim 5, wherein the processor is to determine an initial calibration-compensation coefficient based on a compensation table which correlates the initial calibration-compensation coefficient with light-emitting properties of the light emitter, and
   wherein the glossy sheet-determination instructions comprise instructions to calculate the reflected-light-amount-equivalent value based on the initial calibration-compensation coefficient and a value of the amount of regular reflected light that is standardized based on the amount of diffuse reflected light.

7. The image forming apparatus according to claim 5, wherein the light receiver comprises a light-receiving sensor to detect the amount of transmitted light, the amount of regular reflected light, or the amount of diffuse reflected light,
   wherein the processor is to:
      receive a distance between the light emitter and the light-receiving sensor, and
      determine a conveying path width-compensation coefficient based on a compensation table which correlates the conveying path width-compensation coefficient with the distance between the light emitter and the light-receiving sensor, and
   wherein the glossy sheet-determination instructions comprise instructions to calculate the regular reflected-light-amount-equivalent value based on the conveying path width-compensation coefficient and the amount of regular reflected light.

8. The image forming apparatus according to claim 5, wherein the light receiver comprises a light-receiving sensor to detect the amount of transmitted light, the amount of regular reflected light, or the amount of diffuse reflected light, and
   wherein the glossy sheet-determination instructions comprise instructions to calculate the glossy sheet-determination coefficient with the following equation:

Glossy sheet-determination coefficient=(the amount of regular reflected light·$Kgr$)+$Ka$\{(the amount of regular reflected light/the amount of diffuse reflected light)−1\} wherein, $Kgr$ represents a conveying path width-compensation coefficient that is determined based on a distance between the light emitter and the light-receiving sensor, and $Ka$ represents an initial calibration-compensation coefficient that is determined based on light-emitting properties of the light emitter.

9. The image forming apparatus according to claim 5,
wherein the processor-readable instructions include plain sheet-thickness determination instructions to calculate a compensated amount of transmitted light by standardizing the amount of transmitted light based on the amount of diffuse reflected light, to calculate a compensated amount of reflected light by standardizing the amount of regular reflected light based on the amount of diffuse reflected light, to calculate a plain sheet-thickness coefficient by adding the compensated amount of transmitted light to the compensated amount of reflected light, and to determine the basis weight or thickness of the medium based on the plain sheet-thickness coefficient,
wherein the glossy sheet-thickness determination instructions comprise instructions to determine the basis weight or thickness of the medium when the glossy sheet-determination instructions determine that the medium is a glossy sheet, and
wherein the plain sheet-thickness determination instructions comprise instructions to determine the basis weight or thickness of the medium when it is determined that the medium is a plain sheet.

10. The image forming apparatus according to claim 9,
wherein the processor is to determine an initial calibration-compensation coefficient based on a compensation table which correlates the initial calibration-compensation coefficient with light-emitting properties of the light emitter, and
wherein the plain sheet-thickness determination instructions comprise instructions to calculate the compensated amount of reflected light based on the initial calibration-compensation coefficient and a value of the amount of regular reflected light that is standardized based on the amount of diffuse reflected light.

11. The image forming apparatus according to claim 9,
wherein the light receiver comprises a light-receiving sensor to detect the amount of transmitted light, the amount of regular reflected light, or the amount of diffuse reflected light,
wherein the processor is to:
receive a distance between the light emitter and the light-receiving sensor, and
determine a conveying path width-compensation coefficient based on a compensation table which correlates the conveying path width-compensation coefficient with the distance between the light emitter and the light-receiving sensor, and
wherein the plain sheet-thickness determination instructions comprise instructions to calculate the compensated amount of transmitted light by standardizing the amount of transmitted light based on the conveying path width-compensation coefficient and the amount of diffuse reflected light.

12. The image forming apparatus according to claim 9,
wherein the light receiver comprises a light-receiving sensor to detect the amount of transmitted light, the amount of regular reflected light, or the amount of diffuse reflected light, and
wherein the plain sheet-thickness determination instructions comprise instructions to calculate the plain sheet-thickness coefficient based on the following equation:

Plain sheet-thickness coefficient=the amount of transmitted light/(the amount of diffuse reflected light$^\char`\^$Km)+Ka{(the amount of regular reflected light/the amount of diffuse reflected light)−1} wherein, Km represents a conveying path width-compensation coefficient that is determined based on a distance between the light emitter and the light-receiving sensor, and Ka represents an initial calibration-compensation coefficient that is determined depending on light-emitting properties of the light emitter.

13. The image forming apparatus according to claim 1,
wherein the optical sensor comprises a light-receiving sensor to:
rotationally move around a measurement point as a center, which is an intersection point between an optical axis of the light emitter and the medium, in a measurement plane as a plane perpendicular to the medium and including the optical axis,
measure the amount of transmitted light at a regular transmission angle,
measure the amount of regular reflected light at a regular reflection angle, and
measure the amount of diffuse reflected light at a diffuse reflection angle.

14. The image forming apparatus according to claim 1,
wherein the optical sensor comprises a first light-receiving sensor and a second light-receiving sensor to rotationally move around a measurement point as a center, which is an intersection point between an optical axis of the light emitter and the medium, in a measurement plane as a plane perpendicular to the medium and including the optical axis,
wherein the first light-receiving sensor is to measure the amount of transmitted light at a regular transmission angle, and
wherein the second light-receiving sensor is to measure the amount of regular reflected light at a regular reflection angle, and to measure the amount of diffuse reflected light at a diffuse reflection angle.

15. The image forming apparatus according to claim 1, wherein the printing condition comprises at least one of a conveying speed, a transfer condition, or a fixing condition.

16. A method comprising:
radiating detection light to a medium;
detecting an amount of transmitted light, an amount of regular reflected light, and an amount of diffuse reflected light;
receiving a reflected-light-amount-equivalent value when the amount of regular reflected light is standardized based on the amount of diffuse reflected light;
calculating a glossy sheet-thickness coefficient by adding the reflected-light-amount-equivalent value to a transmitted-light-amount-equivalent value that is based on the amount of transmitted light;
determining a weight property of the medium based on the glossy sheet-thickness coefficient, wherein the weight property comprises a basis weight or a thickness of the medium;
selecting a printing condition according to the weight property of the medium; and
performing a printing process using the selected printing condition.

17. The method of claim 16, wherein the printing condition comprises at least one of a conveying speed, a transfer condition, or a fixing condition.

18. An image forming apparatus comprising:
an optical sensor comprising a light emitter to radiate light to a medium on which a toner image is formed, and a light receiver to detect an amount of transmitted light, an amount of regular reflected light, and an amount of diffuse reflected light; and a processor to:
- calculate a glossy sheet-thickness coefficient by adding a reflected-light-amount-equivalent value to a transmitted-light-amount-equivalent value, wherein the reflected-light-amount-equivalent value is obtained when the amount of regular reflected light is standardized based on the amount of diffuse reflected light, and wherein the transmitted-light-amount-equivalent value is based on the amount of transmitted light, and
- determine a weight property of the medium based on the glossy sheet-thickness coefficient, wherein the weight property comprises a basis weight or a thickness of the medium, wherein the optical sensor comprises a light-receiving sensor to:
- rotationally move around a measurement point as a center, which is an intersection point between an optical axis of the light emitter and the medium, in a measurement plane as a plane perpendicular to the medium and including the optical axis,
- measure the amount of transmitted light at a regular transmission angle,
- measure the amount of regular reflected light at a regular reflection angle, and
- measure the amount of diffuse reflected light at a diffuse reflection angle.

\* \* \* \* \*